(12) United States Patent
Wulf et al.

(10) Patent No.: US 10,573,108 B2
(45) Date of Patent: Feb. 25, 2020

(54) SYSTEM AND METHOD FOR CONTROLLING ACCESS TO A SECURED AREA FOR THE DELIVERY OF PARCEL SHIPMENTS

(71) Applicant: Universität Hamburg, Hamburg (DE)

(72) Inventors: Julian Wulf, Hamburg (DE); Felix Ueckermann, Hamburg (DE)

(73) Assignee: Uniberry GmbH, Hamburg (DE)

( * ) Notice: Subject to any disclaimer, the term of this patent is extended or adjusted under 35 U.S.C. 154(b) by 0 days.

(21) Appl. No.: 16/093,892

(22) PCT Filed: Apr. 13, 2017

(86) PCT No.: PCT/EP2017/059004
§ 371 (c)(1),
(2) Date: Oct. 15, 2018

(87) PCT Pub. No.: WO2017/178622
PCT Pub. Date: Oct. 19, 2017

(65) Prior Publication Data
US 2019/0088054 A1    Mar. 21, 2019

(30) Foreign Application Priority Data
Apr. 15, 2016 (DE) .................. 10 2016 107 020

(51) Int. Cl.
A47G 29/12 (2006.01)
A47G 29/14 (2006.01)
(Continued)

(52) U.S. Cl.
CPC ....... *G07C 9/00309* (2013.01); *A47G 29/141* (2013.01); *G06K 7/10544* (2013.01);
(Continued)

(58) Field of Classification Search
CPC ............. G06K 7/10544; G06Q 10/083; G06Q 10/0833; G06Q 10/08; G06Q 10/0836;
(Continued)

(56) References Cited

U.S. PATENT DOCUMENTS

2002/0130172 A1 * 9/2002 Hara .................... A47G 29/141
232/18
2002/0156645 A1  10/2002 Hansen
(Continued)

FOREIGN PATENT DOCUMENTS

DE        10246650 A1    4/2004
DE     102012205379 A1    9/2013
(Continued)

OTHER PUBLICATIONS

PCT/EP2017/059004; filed Apr. 13, 2017; International Preliminary Report on Patentability dated Oct. 25, 2018; Universität Hamburg (8 pages).
(Continued)

*Primary Examiner* — Dionne Pendleton
(74) *Attorney, Agent, or Firm* — Barclay Damon LLP

(57) ABSTRACT

A system for controlling access to a secured area for the delivery of parcel shipments comprises an access device, a central server unit that is connected to the access device, and at least one database, which is linked with the central server unit. The access device further comprises a reading unit for recognizing a shipment number of a parcel shipment that is to be submitted and a transmitting unit for transmitting to the central server unit the recognized shipment number together with an identification number that identifies the access device. The central server unit is configured to check the shipment number and the identification number against the at least one database in order to retrieve registration information and shipment status. The central server unit is
(Continued)

configured to transmit a release signal to the access device and the access device is configured to receive the release signal activate door opener.

20 Claims, 4 Drawing Sheets

(51) Int. Cl.
*G07C 9/00* (2020.01)
*G06Q 10/08* (2012.01)
*G06K 7/10* (2006.01)

(52) U.S. Cl.
CPC ..... *G06Q 10/0832* (2013.01); *G06Q 10/0833* (2013.01); *G06Q 10/0836* (2013.01); *G07C 9/00571* (2013.01); *A47G 2029/143* (2013.01); *A47G 2029/145* (2013.01); *A47G 2029/146* (2013.01); *A47G 2029/149* (2013.01); *G07C 2009/00404* (2013.01); *G07C 2009/00507* (2013.01)

(58) Field of Classification Search
CPC ............... G06Q 20/12; G06Q 30/0601; G06Q 10/0832; G06Q 10/087; G06Q 10/047; G06Q 10/0835; G06Q 10/0837; G06Q 10/1097; G06Q 2220/00; G06Q 30/02; G06Q 30/0225; G06Q 30/0257; G06Q 30/0258; G06Q 50/28; G06Q 50/32; G07C 2009/00404; G07C 2009/00507; G07C 2009/0092; G07C 9/00309; G07C 9/00571; G07C 9/00896; G07C 2009/00793; G07C 2209/08; G07C 2009/00373; G07C 2009/00412; G07C 2009/00468; G07C 2009/00642; G07C 2009/00769; G07C 2209/63; G07C 2209/64; G07C 9/00; G07C 9/00103; G07C 9/00111; G07C 9/00119; G07C 9/00182; G07C 9/00817; G07C 9/00904; G07C 9/00912; A47G 2029/145; A47G 29/141; A47G 2029/149; A47G 29/16; A47G 29/20; A47G 2029/144; A47G 2029/147; A47B 81/00; A47F 10/02; G07F 17/12; G07F 7/00; G07F 11/002; G07F 5/18; H05K 5/0017; G06F 1/04; G06F 1/10; G06F 1/12; G06F 1/24; G06F 21/31; H04L 2209/805; H04L 63/045; H04L 63/062; H04L 63/08; H04L 63/10; H04L 67/10; H04L 67/12; H04L 67/18; H04L 7/0012; H04L 9/00; H04L 9/0637; H04L 9/08; H04L 9/0819; H04L 9/088; H04L 9/14; H04L 9/302; H04L 9/3242; H04L 9/3247; H04L 9/3249; H04W 12/08; H04W 4/029; H04W 4/80; H04W 56/001; H04W 76/10; B64C 2201/027; B64C 2201/128; B64C 2201/18; B64C 39/024; E05B 43/005; E05B 47/0001; E05B 65/0003; E05B 65/0078; E05B 65/5246; E05C 9/08; E05C 9/18; F25D 2400/361; F25D 29/006; G05D 1/0676; G05D 23/19

See application file for complete search history.

(56) References Cited

U.S. PATENT DOCUMENTS

| 2003/0231112 | A1  |    | 12/2003 | Raju    |                   |
|--------------|-----|----|---------|---------|-------------------|
| 2005/0108107 | A1  | *  | 5/2005  | Grayson | ........ G06Q 30/02 |
|              |     |    |         |         | 705/26.1          |
| 2009/0076933 | A1  | *  | 3/2009  | Park    | ........ G06Q 10/047 |
|              |     |    |         |         | 705/28            |
| 2015/0186840 | A1  | *  | 7/2015  | Torres  | ........ A47B 81/00 |
|              |     |    |         |         | 705/339           |
| 2015/0371187 | A1  | *  | 12/2015 | Irwin   | ........ G06Q 10/0836 |
|              |     |    |         |         | 705/72            |
| 2016/0232479 | A1  | *  | 8/2016  | Skaaksrud | ...... G06Q 10/0836 |
| 2016/0267738 | A1  | *  | 9/2016  | Carstens | ........ A47G 29/141 |
| 2018/0053139 | A1  | *  | 2/2018  | Stoman  | ........ G06Q 10/083 |
| 2018/0144299 | A1  | *  | 5/2018  | Simms   | ........ G07C 9/00896 |
| 2019/0130348 | A1  | *  | 5/2019  | Mellado | ........ G06Q 50/28 |

FOREIGN PATENT DOCUMENTS

| DE | 102014105247 A1 | 6/2015 |
|----|-----------------|--------|
| EP | 2075769 A2      | 7/2009 |

OTHER PUBLICATIONS

PCT/EP2017/059004; filed Apr. 14, 2017; International Search Report dated Jul. 14, 2017; Universität Hamburg (6 pages).

\* cited by examiner

SYSTEM AND METHOD FOR CONTROLLING ACCESS TO A SECURED AREA FOR THE DELIVERY OF PARCEL SHIPMENTS

CROSS REFERENCE TO RELATED INVENTION

This application is a national stage application pursuant to 35 U.S.C. § 371 of International Application No. PCT/EP2017/059004, filed on Apr. 13, 2017, which claims priority to, and benefit of, German Patent Application No. 10 2016 107 020.3, filed Apr. 15, 2016, the entire contents of which are hereby incorporated by reference.

BACKGROUND

The invention relates to a system and a method for controlling access to a secured area for the delivery of parcel shipments.

During the delivery of parcel shipments, a delivery by the parcel carrier often fails due to the absence of the recipient. The parcel shipment must then be left by the parcel carrier at a post office, at a packet shop or with a neighbor, for example. The recipient has to pick up the shipment intended for him or her at the specified location, wherein the recipient is dependent upon the opening times of the establishment or the presence of the neighbor, respectively. Alternatively, a delivery can be made to central parcel stations. A disadvantage here, however, is that the shipment must be retrieved by the recipient. Parcel mail boxes for single and multi-family dwellings are additionally known. Parcel mail boxes for multi-family dwellings are usually installed within the building. In order to deliver a parcel shipment, the parcel carrier making the delivery must then gain access to the building on the one hand and have access to the parcel mail boxes on the other hand. In some places, postal carriers may have a key to the front door, but parcel carriers do not. Moreover, it is impracticable to carry a key for each house in the delivery area, especially in large cities. Therefore, it is rarely possible to gain access to the building or access to a parcel mail box if the recipient is absent.

A system for controlling access is known from DE 10 2012 205 379 A1, for example. In this case, a door camera installed at the front door is used to record an image. This image is evaluated on the basis of previously defined patterns and is checked against patterns stored in a database. Depending upon the result of the evaluation, the door is opened. Using this pattern recognition, it is possible to recognize the face of a person seeking access, for example. A disadvantage here is that corresponding pattern information must be recorded for each parcel carrier who is supposed to gain access to the building and must be stored for later evaluation in the database. Furthermore, recognition of this type is highly prone to error, since entry into the building could be denied depending upon the facial expression of the person or depending upon the lighting conditions. Moreover, it is undesirable to grant all parcel carriers access to the building at all times. In addition, an identification code displayed on a mobile terminal via the camera can be evaluated, for example. To do so, however, the person seeking access must carry a corresponding device at all times and it must be configured to receive the identification codes.

A method for depositing parcels in a locker system is known from DE 10 246 650 A1. It is provided that a parcel carrier identifies himself or herself at the locker system, such as by means of a PIN or an identification card. The parcel carriers must always carry a handheld device in order to scan the shipment number and, based on the shipment number as well as the date and time, to generate a collection number, with which the recipient can open the locker system. The collection number must be transmitted to the recipient. Disadvantageously, each parcel carrier must be personally registered before using the system in this method, as well. Moreover, the parcel carrier must always carry the handheld device with him or her.

A method and a system for securely delivering a parcel have become known from EP 2 075 769 A2. To gain access to the secured area, the parcel carrier must enter the shipment number of the parcel to be delivered by means of a number panel on an electronic lock. The electronic lock checks the shipment number entered against a shipment number previously received from the delivery company and opens if the shipment numbers match. After a prescribed period of time, the electronic lock is locked again. The shipment numbers must be activated as an opening code beforehand. Either the recipient has to save them manually in the electronic lock or the electronic lock must be configured to receive e-mails from the delivery companies, from which it then retrieves shipment information. The retrieval occurs by means of supplier-specific templates that are to be saved in the electronic lock. Additionally, on the basis of a further template, the web-based shipment tracking of the respective delivery company is called up using the shipment number and the shipment status is retrieved. The electronic lock sends a query to the delivery providers hourly or daily as to the shipment status of the shipments for which the electronic lock has received an e-mail with a shipment number. A disadvantage is that the system must be configured to ensure the receipt of e-mails from the delivery companies. Furthermore, the recognition of shipment numbers and shipment statuses via templates stored in the system is very prone to error. For instance, if a delivery company changes the structure of the e-mails or the website, the template will no longer function. This makes continuous updates of the template on all systems necessary. It is also possible that the system will not accept a shipment number entered by the parcel carrier because the shipment status is not current, since the system may not have retrieved it yet on the day of delivery.

BRIEF SUMMARY OF THE INVENTION

The invention addresses the problem of providing a system and a method for controlling access to a secured area for the delivery of parcel shipments, which also permit the delivery of parcel shipments when the recipient is absent and are particularly simple and secure. In particular, the stated disadvantages should be avoided.

The invention relates to a system for controlling access to a secured area for the delivery of parcel shipments comprising an access device, a central server unit that is connected to the access device, and at least one database, which is linked with the central server unit. The access device further comprises a reading unit for recognizing a shipment number of a parcel shipment that is to be submitted and a transmitting unit for transmitting to the central server unit the recognized shipment number together with an identification number that identifies the access device. The central server unit is configured to check the shipment number against the at least one database in order to retrieve at least the recipient name and the shipment status. The central server unit is further configured to check the identification number against the at least one data base in order to retrieve registration information, and to check the recipient name against the registration information in order to determine whether the shipment recipient has registered a receiving address at the location of the access device. The central server unit is configured to transmit a release signal to the access device, wherein the central server unit transmits the release signal to the access device when the shipment is out for delivery and the shipment recipient has registered a receiving address at the location of the access device. The access device comprises a receiving unit for receiving the release signal and a control unit for activating a door opener in reaction to the release signal.

The invention further relates to a method for controlling access to a secured area for the delivery of parcel shipments comprising recognizing a shipment number of a parcel shipment to be shipped using an access device located at a delivery location. Transmitting, via the access device, the recognized shipment number and an identification number that identifies the access device to a central server unit. Retrieving the recipient name and shipment status from the central server unit. The registration information is retrieved by transmitting the identification number from the central server unit to at least one database. The recipient name, which has been retrieved via the shipment number, is checked against the registration information by the central server unit in order to determine whether the shipment recipient has registered a receiving address at the location of the access device. A release signal is transmitted by the central server unit to the access device when the shipment is out for delivery and the shipment recipient has registered a receiving address at the location of the access device. A door opener is activated by the access device in reaction to the release signal.

In the system and method according to the invention, the shipment number of a parcel shipment that is to be delivered is recognized by an access device and is transmitted to a central server unit together with an identification number of the access device. Said server unit transmits the shipment number to at least one database in order to retrieve the recipient name and shipment status. Additionally, the identification number of the access device is transmitted from the central server unit to the at least one database in order to retrieve registration information. The recipient name is checked against the registration information in order to determine whether the shipment recipient has registered a receiving address at the location of the access device. Depending upon this check, a release signal is generated by the central server unit and is transmitted to the access device, which then activates the door opener so as to open the door of a building or parcel depot. Only if the shipment is marked "out for delivery" and the recipient of the shipment at the delivery location is also registered as the recipient will the door be opened. All communications between the central server unit and the access device can occur via the Internet, for example. The system according to the invention is suitable for implementing the method according to the invention. The following explanations refer both to the method according to the invention and to the system according to the invention.

In an embodiment, the system comprises an access device, a central server unit that is linked with the access device and at least one data base, which is linked with the central server unit. The access device can be installed on or next to the front door of a multi-family dwelling, for example, in order to permit access to the building. The access device can also be installed on a parcel depot within a building so as to grant access to the parcel depot. According to the invention, the access device comprises at least a reading unit, a transmitting unit, a receiving unit and a control unit for activating a door opener.

The reading unit of the access device is configured to recognize the shipment number of a parcel shipment. To this end, a parcel carrier can manually transfer the shipment number to the reading unit, for example, such as by entering the number by means of an input panel. Preferably, the reading unit can automatically recognize the shipment number of a parcel to be delivered. According to a preferred embodiment, the reading unit of the access device comprises a scanner, which can read out a shipment number applied to the shipment to be delivered. Accordingly, the scanning of the shipment number of the parcel shipment to be delivered can be carried out by the reading unit of the access device, which includes a scanner. The shipment number can be applied to the shipment as a barcode or as a QR code, for example. Accordingly, the scanner can be a barcode scanner.

The transmitting unit of the access device is configured to transmit the shipment number, which was recognized on a parcel shipment to be delivered by the reading unit of the access device, to the central server unit. For this purpose, the access device can be linked with the central server unit via the transmitting unit, for instance, via a mobile data network such as UMTS, LTE or another radio link. The connection between the access device and the central server unit can also be established via a local network, for instance, via cable using LAN or wirelessly via a WLAN connection. The access device preferably comprises a combined transmitting and receiving unit for a wireless, bidirectional link with the central server unit. Communications between the central server unit and the transmitting unit, in particular the transmitting and receiving unit, of the access device can occur via the Internet, for example. According to an embodiment, the reading unit of the access device is additionally configured to transmit to the central server unit the identification number that identifies the access device. This identification number is specific to each access device and permits the central server unit to assign the access device to a location, such as an address.

The central server unit is configured to check both the shipment number and the identification number of the access device against the information stored in the at least one database. As a result of this check, the central server unit determines, on the one hand, the recipient name and the shipment status of the shipment to be delivered using the shipment number and, on the other hand, the registration information using the identification number. Thus, among other things, the recipient name and the shipment status as well as further registration information can be stored in the at least one database. Multiple databases can also be provided, wherein the aforementioned data can be saved in different databases. The shipment information, such as recipient name and shipment status, can then be transmitted directly from the delivery providers to the central server unit. The central server unit can also have access to the shipment information of the delivery providers. For instance, the central server unit can directly access one or more of the databases of the delivery providers. The central server unit can also gain indirect access to the data in one or more databases of the delivery providers, for example, via intermediary servers or computer systems of the delivery providers.

The central server unit is further configured to check the recipient name determined from the shipment number against the registration information detected from the identification number. It is determined in this way whether the shipment recipient has registered a receiving address at the location of the access device. If the shipment recipient has registered a receiving address at the location of the access device and the determined shipment status has identified the shipment as being out for delivery, the central server unit generates a release signal and transmits it to the access device. The receiving unit of the access device receives the release signal, and the control unit of the access device then activates a door opener to grant access to the secured area. One condition for granting access is thus to verify whether the shipment recipient has even registered a delivery address at the planned delivery location. In this way, it is possible to prevent the possibility of moving any given access device of the system according to the invention with a shipment number to activate the door opener. A further condition is to verify whether the shipment is out for delivery. Only if the delivery provider has marked the shipment as "out for delivery," for example, is the release signal generated and access thereby granted to the secured area. A shipment number thus functions as an access code to the secured area only as long as shipment is out for delivery. In particular, this serves to prevent multiple deliveries. In addition, the parcel carrier or a third person could otherwise gain entry at any time using an old shipment number.

According to one embodiment, the access device can transmit a shipment status signal to the central server unit via its transmitting unit, whereupon the central server unit modifies the shipment status stored in the at least one database, in particular as no longer out for delivery but rather marked as "delivered," for example. This can occur, for instance, after a defined period of time following the receipt of the release signal by the receiving unit of the access device or upon successful activation of the door opener by the access device or after a door that has been activated by the door opener is closed again.

According to another embodiment, the system comprises a front door and/or the door of a parcel depot, which is opened by the door opener of the access device in reaction to the release signal. The system can thus permit both entry into a building and access to a parcel depot.

According to a further embodiment, the central server unit is configured to transmit an error signal to the access device, wherein the central server unit transmits the error signal to the access device when the shipment is not identified as "out for delivery" and/or the shipment recipient has not registered a receiving address at the location of the access device. The access device in this instance can have a receiving unit for receiving the error signal and a display apparatus, wherein the display apparatus produces an error message upon receipt of the error signal. In this way, an error message can be sent to the parcel carrier who is delivering the shipment if the shipment number of the parcel does not authorize access. The display apparatus of the access device can be a display screen or a light source such as an LED. The central server unit can also be configured to save every generated error message in the at least one database. It is thereby possible to monitor at which access devices at what times and with which shipment number an unauthorized attempt at access was made.

According to an embodiment, the registration information includes the name of the recipient registered at the location of the access device, in particular all names of all recipients registered at the location of the access device. According to one preferred embodiment, this registration information can be generated when people who would like to use the system according to the invention register before their first use of the system by entering at least their names and at least a receiving address. For instance, this registration can be carried out online via an Internet portal that is linked with the central server unit. The central server unit can save the registration information as user data in the at least one database. As a result of the registration, the recipient can be associated with a specific access device. In particular, all recipients registered at the corresponding address can thus be associated with this access device. A recipient can also be associated with multiple access devices. A recipient can therefore utilize the system according to the invention at multiple receiving addresses. By the transmission of the recognized shipment number from the central server unit to the at least one database, the registration information can be retrieved.

According to a further embodiment, the registration information additionally includes a delivery authorization for at least one delivery provider. The central server unit can then be configured to check the recipient name against the delivery authorization, wherein the central server unit transmits the release signal to the access device only if the respective delivery provider has been authorized by the recipient. For instance, when registering for the system according to the invention for the first time, a recipient can authorize one or more delivery providers via an Internet portal, for example. The authorization can be saved in the at least one database as a part of the registration information. Preferably, basically all delivery providers are authorized, and the recipient can withhold delivery authorization from individual delivery providers and thereby block them. The registered recipient can also authorize or block further delivery providers later, for example, via the Internet portal used for the registration. In this way, a recipient can block one or more delivery providers if he or she does not wish to grant access to the secured area, in particular the house or the parcel depot. The authorization information can preferably be saved in the at least one database.

The system preferably comprises at least one delivery provider database and at least one recipient database, wherein the central server unit is configured to check the shipment number against the at least one delivery provider database in order to retrieve at least the recipient name and the shipment status, and the central server unit is configured to check the identification number against the at least one recipient database in order to retrieve registration information. The central server unit can thus preferably access the databases of various delivery providers. Therefore, it is possible to use the recognized shipment number to retrieve further recipient information, such as the recipient name and the shipment status, directly from the databases of the delivery providers in a reliable way. Moreover, in a preferred embodiment, the system can comprise at least one delivery provider server, wherein the central server unit contacts the at least one delivery provider database via the at least one delivery provider server in order to retrieve at least the recipient name and the shipment status. In this way, the recipient name and shipment status can be retrieved by transmitting the shipment number from the central server unit to at least one delivery provider database via at least one delivery provider server. If the central server unit should not have direct access to the databases of the delivery providers, then a retrieval can be carried out via the servers or respectively computer systems of the respective delivery providers. The registration information can be stored in the recipient database independently of the delivery provider databases.

In an embodiment, the central server unit is configured to associate the transmitted shipment number with a delivery provider and to carry out the check of the shipment number against the at least one delivery provider database if the association was successful and to perform the check of the shipment number against all delivery provider databases if the association was not successful. For example, the central server unit can match these particular delivery providers based on the structure of the recognized shipment numbers and thereby specifically transmit the shipment numbers to their servers or respectively perform a check against the corresponding delivery provider database. If the central server unit does not recognize the structure of the shipment number or cannot match a delivery provider, then the recognized shipment number can be checked against all delivery provider databases. Even if the shipment numbers of multiple delivery providers have the same structure, the recognized shipment number can accordingly be transmitted to these delivery providers and checked against their data.

According to a further embodiment, the access device is configured to perform a preliminary check of the structure of the recognized shipment number in order to determine whether it is a shipment number. The access device can thus recognize whether a number is apparently not a shipment number and, for example, can produce an error message by means of a display apparatus of the access device. If the system includes a barcode scanner, then an attempt could be made to scan the barcode of a beverage container, for instance. The access device recognizes in this case that it is apparently not a shipment number. For example, the access device could be designed to relay only detected numbers with a defined number of digits, such as numbers with four or more digits, to the central server unit. In this way, the central server unit is prevented from receiving a multitude of unnecessary queries.

It is ensured by the system and the method according to the invention that a parcel carrier is always able to provide a shipment that is to be delivered. It is not necessary to make another delivery attempt. The shipment also will no longer have to be retrieved at a post office or at a packet shop. Regardless of the presence of the recipient, a successful delivery can be made easily and efficiently and at any time of day. Moreover, it is not necessary to provide a key or other means of access for every parcel carrier. Access is basically controlled independently of the person making the delivery. A control of access is carried out exclusively on the basis of the shipment number located on the shipment. Accordingly, the parcel carrier does not have to carry any additional devices with him or her. Furthermore, access to the secured area is possible only under strict conditions because access is granted only if the shipment is intended for someone in the building in question and if the shipment is also marked as out for delivery in the database. Thus neither the parcel carrier nor a third party can obtain access to the building when the shipment is not marked as "out for delivery". Even if the shipment is marked as "out for delivery," the shipment number can be used to access only the building in which the shipment recipient is registered. Fundamentally, a pull principle underlies the system and the method according to the invention: The access device first becomes active when it recognizes a shipment number. On the one hand, this is especially efficient. On the other hand, it ensures that the identified shipment status is always current. Additionally, it is not necessary to use templates to ascertain shipment information like the shipment status. The shipment information is provided by the delivery providers or can be retrieved directly from their databases.

BRIEF DESCRIPTION OF THE DRAWINGS

Hereafter, the system according to the invention or respectively the method according to the invention will be explained on the basis of an exemplary embodiment. The following is shown.

DETAILED DESCRIPTION OF THE INVENTION

In the text which follows, the same reference signs designate the same objects.

Figure 1:
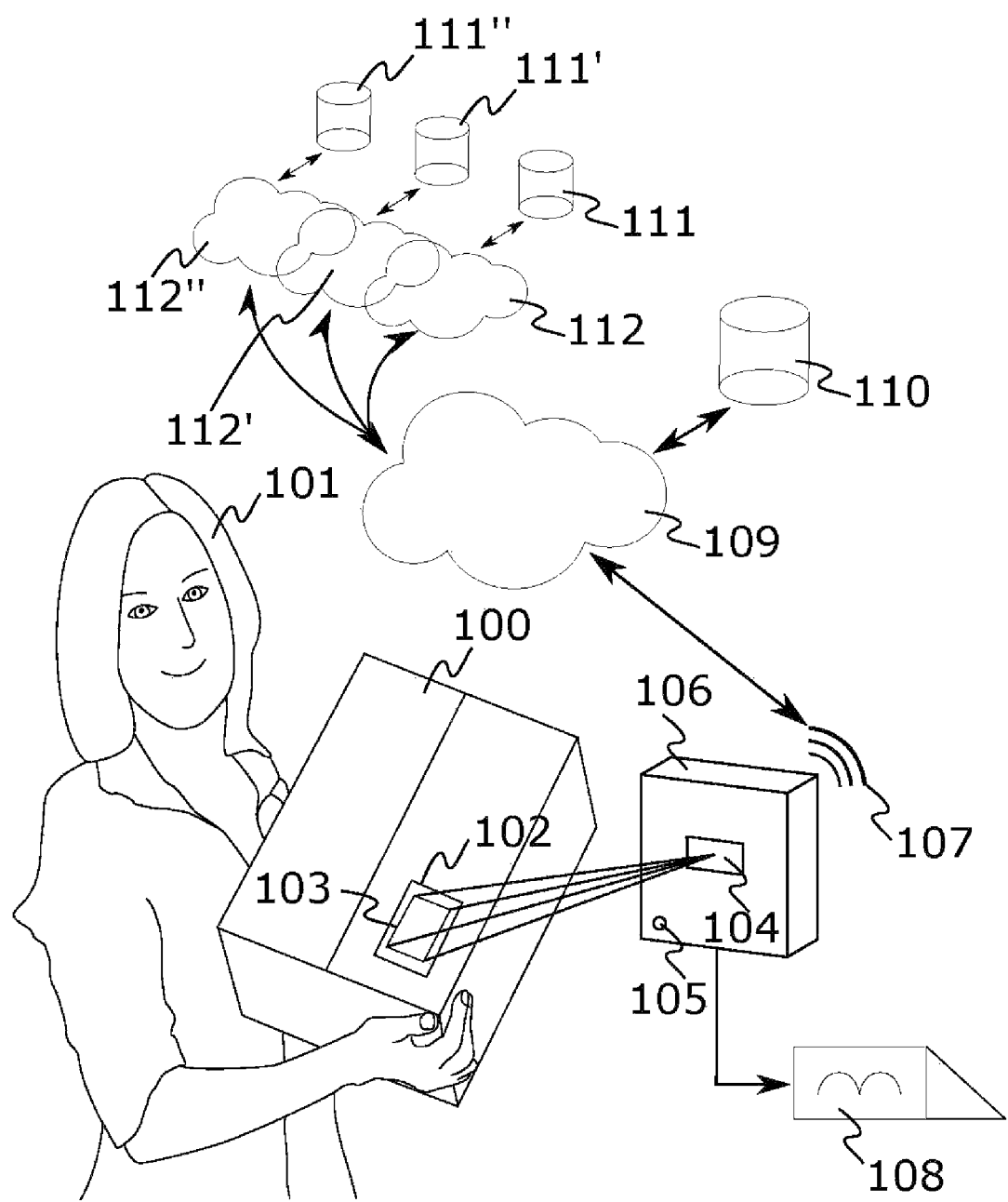
FIG. 1 illustrates a schematic representation of an embodiment of a system for controlling access to a secured area for the delivery of parcel shipments.

FIG. 1 shows an embodiment of the system according to the invention or respectively the method according to the invention. A parcel carrier 101 with a shipment 100 and a label 102 attached to the shipment can be recognized. The label 102 includes a shipment number. Reference sign 103 identifies a detection area of a barcode scanner 104 of an access device 106. The access device 106 further includes a display apparatus 105. The access device 106 is linked with a door opener 108 and, via a wireless link 107, with a central server unit 109. The central server unit 109, in turn, is linked with a recipient database 110 and, via delivery provider servers 112, 112', 112", with delivery provider databases 111, 111', 111".

Figure 2:
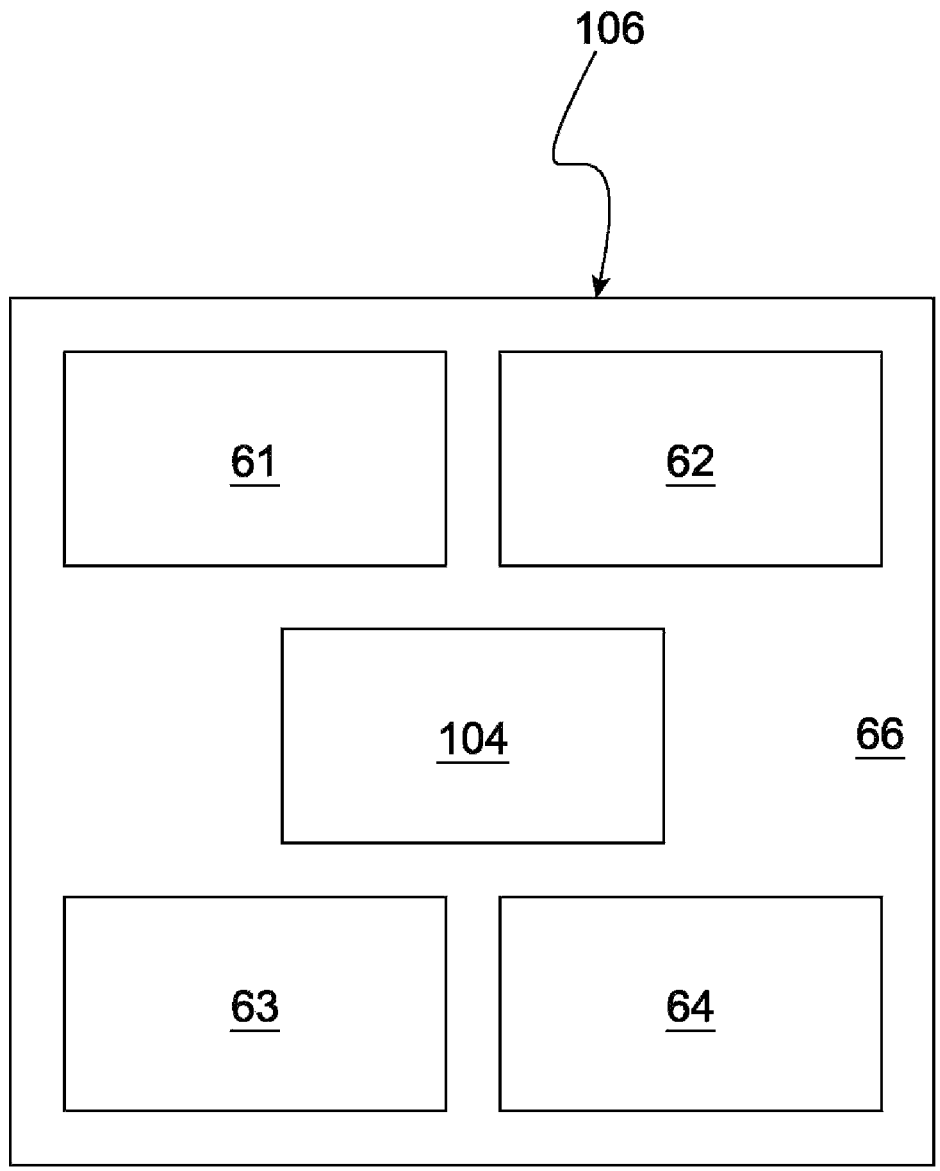
FIG. 2 illustrates a schematic representation of an embodiment of an access device of the system.

FIG. 2 schematically shows the structure of the access device 106. A processor unit 61, a transmitting and receiving unit 62, a voltage source 63, a scanning unit 104 and an actuator control 64 for activating the door opener 108 are arranged on a circuit board 66.

Hereafter, the operating principles of the system or respectively the method will be explained on the basis of all drawings (FIGS. 1-4). To deliver a parcel shipment 100, a parcel carrier 101 holds the label 102 with the shipment number in the detection area 103 of the reading unit 104 of the access device 106. The reading unit 104 of the access device 106 reads out the shipment number. In particular, said reading unit 104 can be a barcode scanner, which detects a shipment number that is provided as a barcode. This process is identified as step 1 in the flow chart in FIG. 3 ("Code is scanned").

Figure 3:
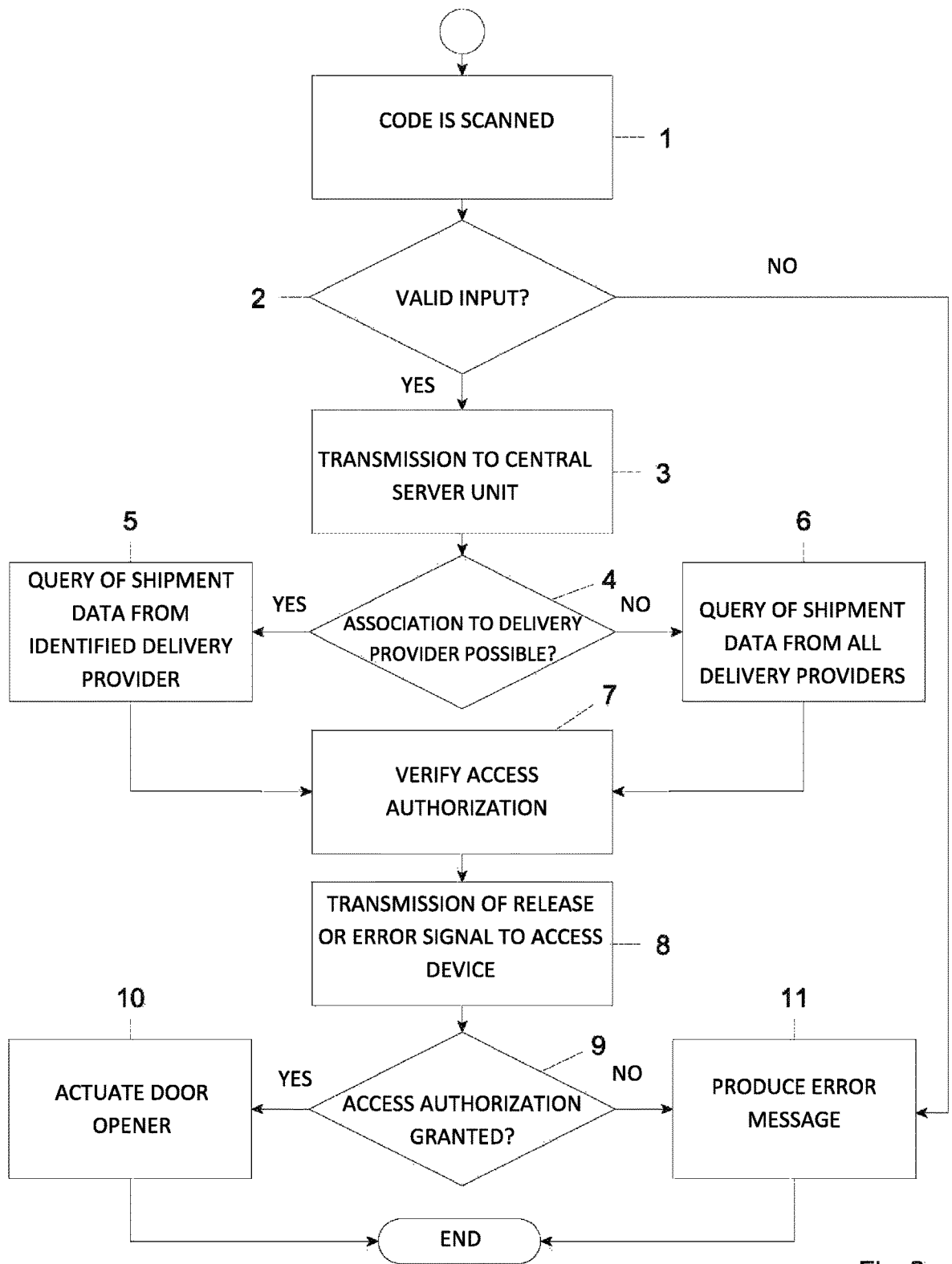
FIG. 3 illustrates a flow chart of an embodiment of a method of controlling access to a secured area for the delivery of parcel shipments.

The access device 106 can subsequently perform a preliminary check of the recognized shipment number using its processor unit 61. In this way, it is possible to screen out any detected numbers that are apparently not shipment numbers. For example, numbers with fewer than four digits can be categorically eliminated, since they usually do not represent shipment numbers. The step of preliminarily checking the shipment number is identified in FIG. 3 with reference sign 2 ("Valid input?"). If the detected number is apparently not a shipment number, i.e. if the input is not valid, then an error message is produced by the access device 106 (FIG. 3). The error message is produced via the display apparatus 105, which can include a display screen or a light source, for example. The light source can glow red to represent the error message, for instance.

Recognized shipment numbers are transmitted from the access device 106 to the central server unit 109 via a wireless link 107, such as a mobile data network. In addition, the access device 106 transmits an identification number of the access device to the central server unit 109. The transmission of the recognized shipment number and the identification number is designated step 3 ("Transmission to central server unit") in FIG. 3.

The central server unit 109, such as a processor unit, of the central server unit 109, then associates the received shipment number with a possible delivery provider. This association can be made on the basis of structural patterns of the shipment number, which are usually different for all delivery providers. If the association with a particular delivery provider is successful, then the shipment number is transmitted by the central server unit 109 to the corresponding delivery provider to query corresponding shipment data; see step 5 in FIG. 3 ("Query of shipment data from identified delivery provider"). If the association with a specific delivery provider is not successful, then the shipment number is transmitted to all delivery providers that are linked with the central server unit 109; see step 6 in FIG. 3 ("Query of shipment data from all delivery providers"). If the central server unit 109 has direct access to the delivery provider databases 111, 111', 111", then a direct check of the shipment number against said delivery provider databases 111, 111', 111" can be made. In this way, the recipient name and the shipment status are determined from the shipment number recognized by the access device. If the central server unit 109 does not have direct access to the delivery provider databases 111, 111', 111", then a query can be sent via the servers/computer systems 112, 112', 112" of the delivery providers. In this case, the servers/computer systems 112, 112', 112" of the delivery providers can gain access to the delivery provider databases 111, 111', 111" in order to retrieve the recipient name and the shipment status of the recognized shipment number and transmit them to the central server unit 109. As a result of the query, the central server unit thus receives at least the name of the recipient for whom the shipment 100 is intended as well as the shipment status.

The access authorization is verified using the available information, in particular the recipient name, the shipment status and the identification number of the access device 106, which were obtained from the shipment number. This corresponds to step 7 in FIG. 3 ("Verify access authorization"), which is shown in detail in FIG. 4.

Figure 4:
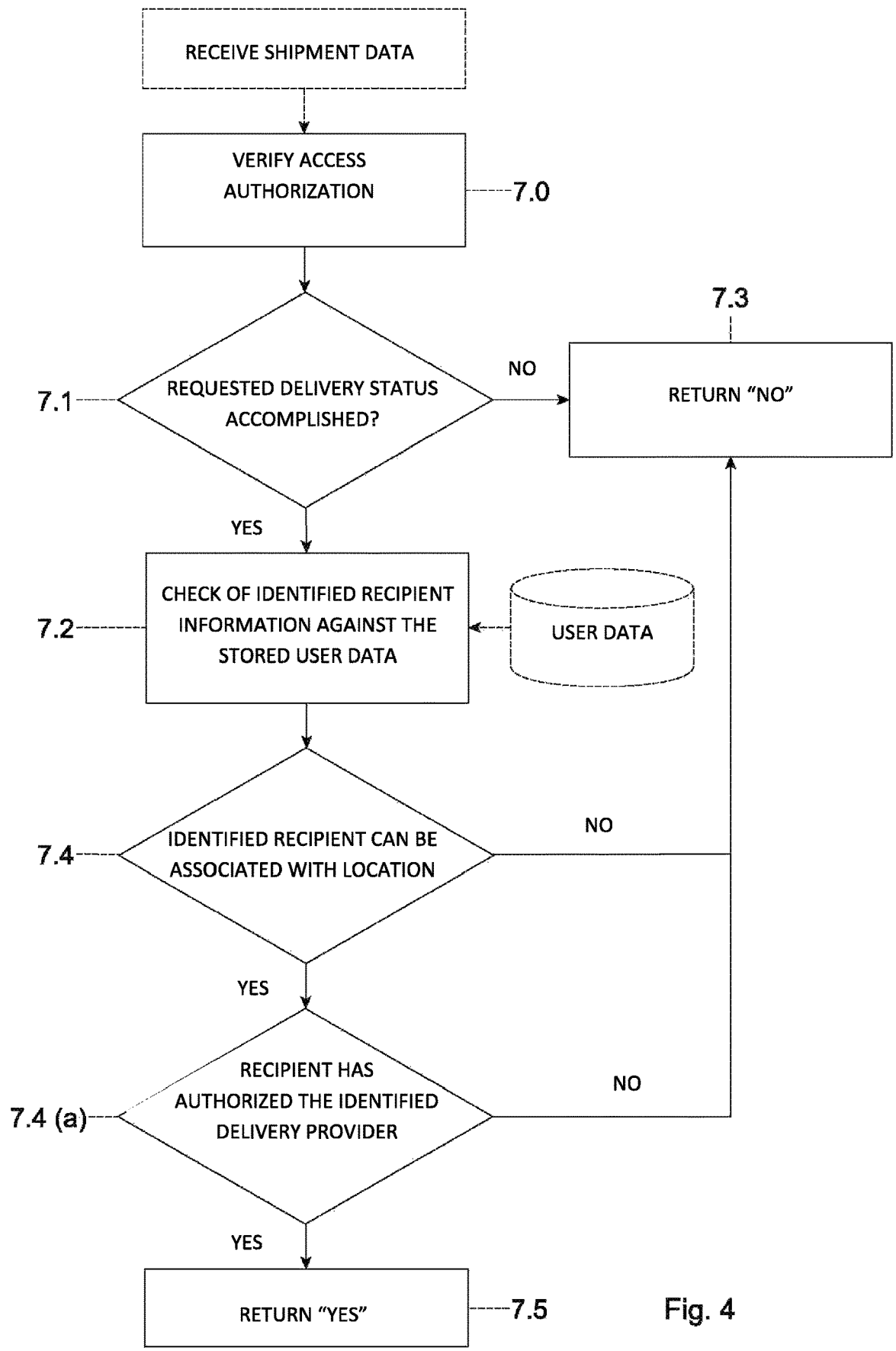
FIG. 4 illustrates a flow chart detailing the step of verifying the access authorization from the flow chart according to FIG. 3.

Based on the identified shipment status, the central server unit 109 verifies whether a requested delivery status has been accomplished; see step 7.1 in FIG. 4 ("Requested delivery status accomplished"). The requested status can be, for instance, that the shipment was defined by the delivery provider as "out for delivery". If the requested delivery status has not been accomplished, then a "No" is returned; step 7.3 in FIG. 4. If the requested delivery status has been accomplished, then it is followed by the next step of verifying the access authorization. Accomplishing the requested delivery status is the first required condition for granting access to the secured area, i.e. the building or the parcel depot. It can be ensured in this way that a shipment number grants access to the secured area only during a particular period of time.

This is followed by a "Check of the identified recipient information against the stored user data"; step 7.2 in FIG. 4. Here, the shipment data obtained in step 5, in particular the recipient name obtained in this way, is checked against the user data stored in a recipient database 110. Registration information is stored in the recipient database 110 as user data, wherein the registration information contains in particular the names of the registered users of the system as well as one or more receiving addresses of the registered users. A person who would like to use the system or respectively method according to the invention can provide this registration information ahead of time in the course of registering with the system. For example, an online portal that is connected to the central server unit 109 can be provided for this purpose. The central server unit 109 can transmit the user data entered via the online portal into the recipient database 110 as registration information. By checking the recipient information obtained from the delivery provider against the recipient database 110, the central server unit 109 can retrieve the names of the registered recipients and their stored receiving addresses. Additionally, the identification numbers of the access devices 106 can be linked in the recipient database or in any desired other data with the addresses of the locations of the access devices 106. The central server unit 109 thus verifies whether the recipient for whom the shipment is intended has saved a receiving address at the location of the access device 106; step 7.4 of FIG. 4 ("Identified recipient can be associated with location"). If the shipment recipient is not successfully associated with the location of the access device, then a "No" is again sent. If the identified shipment recipient is successfully associated with the location of the access device, in other words, if the planned shipment recipient has registered a receiving address at the location of the access device 106, then a "Yes" is sent back, and the check of the access authorization is concluded; step 7.5 in FIG. 4. Successfully associating the recipient with the location of the access device is thus the second required condition for granting access to the secured area, i.e. the building or the parcel depot. It is possible to ensure in this way that a shipment number does not grant access to every secured area having an access device that is a part of the system according to the invention.

Moreover, the verification step 7.4 (*a*) ("Recipient has authorized the identified delivery provider") can optionally be included. Here, the registration information also comprises the delivery providers permitted by the respective shipment recipient. An access authorization is granted only when the planned shipment recipient has authorized the provider delivering the shipment. In this way, access to the secured area can be fundamentally denied to particular delivery providers.

Depending upon the results of the verification of the access authorization in step 7, the central server unit 109 generates a release signal or an error signal and transmits the corresponding signal to the access device 106; step 8 in FIG. 3 ("Transmission of release or error signal to access device"). If a "Yes" is sent by the central server unit after the previous verification of the access authorization, then the central server unit generates the release signal. If a "No" is sent by the central server unit after the previous verification of the access authorization, then the central server unit generates the error signal. Upon receipt of the release signal, the access device 106 activates the door opener 108 via the actuator control 64 in order to open the door to the secured area. Additionally, a light source in the display apparatus can glow green, for example. In reaction to the receipt of the error signal, the access device 106 produces an error message via the display apparatus 105. This corresponds to steps 9 through 11 in FIG. 3.

The invention claimed is:

1. A system for controlling access to a secured area for a delivery of parcel shipments, the system comprising:
   an access device comprising
      a reading unit,
      a transmitting unit,
      a receiver, and
      a control unit having a control server;
   a central server in communication with the access device; and
   at least one database in communication with the central server,
   wherein the reading unit is configured to recognize a shipment number of a parcel shipment that is to be delivered and the transmitting unit is configured to transmit the recognized shipment number, together with an identification number identifying the access device, to the central server,
   wherein the central server is configured to check the shipment number against the at least one database in order to retrieve at least the recipient name and a shipment status and check the identification number against the at least one database in order to retrieve registration information,
   wherein the central server is further configured to check the at least one recipient name against the registration information in order to determine if the at least one recipient has registered a receiving address at a location of the access device,
   wherein the central server is configured to transmit a release signal to the access device,
   wherein the central server transmits the release signal to the access device if the shipment is out for delivery and the shipment recipient has registered a receiving address at the location of the access device, and
   wherein the receiver is configured to receive the release signal from the control server and the control unit is configured to activate a door opener in response to the release signal.

2. The system according to claim 1, wherein the reading unit of the access device further comprises a scanner configured to recognize the shipment number.

3. The system according to claim 1, further comprising a door configured to be opened by the door opener in reaction to the release signal.

4. The system according to claim 1, wherein the central server further comprises a display unit and is configured to transmit an error signal to the receiver of the access device when at least one of the shipment is not out for delivery and the at least one recipient has not registered a receiving address at the location of the access device, wherein the display unit produces an error message when the receiver receives an error signal.

5. The system according to claim 1, wherein the registration information includes a name of the at least one recipient registered at the location of the access device.

6. The system according to claim 5, wherein the registration information includes a delivery authorization for at least one delivery provider, wherein the central server is configured to check the name of the at least one recipient against a delivery authorization and transmits the release signal to the access device if the at least one delivery provider has been authorized by the at least one recipient.

7. The system according to claim 1, further comprising at least one delivery provider database and at least one recipient database, wherein the central server is configured to check the shipment number against the at least one delivery provider database in order to retrieve at least the recipient name and a shipment status, and wherein the central server is configured to check the identification number against the at least one recipient database in order to retrieve registration information.

8. The system according to claim 7, further comprising at least one delivery provider server, wherein the central server is configured to contact the at least one delivery provider database via the at least one delivery provider server in order to retrieve at least the recipient name and the shipment status.

9. The system according to claim 8, wherein the central server is configured to associate the shipment number with a delivery provider and to carry out the check of the shipment number against the at least one delivery provider database if the association was successful, and to perform the check of the shipment number against all delivery provider databases if the association was not successful.

10. The system according to claim 1, wherein the access device is configured to perform a preliminary check of a structure of a recognized shipment number in order to determine whether it is the shipment number.

11. A method for controlling access to a secured area for delivery of parcel shipments, the method comprising:
   recognizing a shipment number of a parcel shipment to be shipped using an access device located at a delivery location;
   transmitting the recognized shipment number and an identification number that identifies the access device to a central server using the access device;
   transmitting the shipment number from the central server to at least one database;
   retrieving a recipient name and shipment status from the central server in response to the transmission of the shipment number;
   transmitting the identification number from the central server to at least one database;
   receiving registration information from the central server in response to the transmission of the identification number;
   checking, using the central server, the recipient name against the registration information in order to determine if the shipment recipient has registered a receiving address at a location of the access device;
   transmitting a release signal via the central server to the access device when the shipment is out for delivery and the shipment recipient has registered a receiving address at the location of the access device; and
   activating a door opener by the access device in response to receipt of the release signal transmitted by the central server.

12. The method according to claim 11, further comprising scanning the shipment number of the parcel shipment that is to be delivered using a reading unit of the access device.

13. The method according to claim 12, wherein the reading unit comprises a scanner.

14. The method according to claim 12, further comprising transmitting an error signal from the central server to the access device if at least one of the parcel shipment is not out for delivery and the recipient has not registered a receiving address at the location of the access device, and wherein the access device further comprises a display apparatus configured to display an error message when the access device receives the error signal.

15. The method according to of claim 14, further comprising registering a recipient as part of the registration information stored in the at least one database, and wherein the registration information is retrieved by transmitting the identification number from the central server to the at least one database.

16. The method according to claim 15, further comprising authorizing at least one delivery provider by the recipient and storing the authorization in the at least one database as a part of the registration information, wherein the transmission of a release signal from the central server to the access device occurs only when the respective delivery provider has been authorized by the recipient.

17. The method according to claim 16, wherein a name of the recipient and shipment status are retrieved by transmitting the shipment number from the central server to at least one delivery provider database, and wherein the registration information is retrieved by transmitting the identification number from the central server unit to at least one recipient database.

18. The method according to claim 17, wherein the name of the recipient and shipment status are retrieved by transmitting the shipment number from the central server to at least one delivery provider database via at least one delivery provider server.

19. The method according to claim 17, further comprising associating the shipment number with a delivery provider by means of the central server based on a structure of the shipment number, wherein the name of the recipient and the shipment status are retrieved by transmitting the shipment number from the central server to a delivery provider database of the associated delivery provider if association was successful, and the name of the recipient and shipment status are retrieved by transmitting the shipment number from the central server to the delivery provider databases of all delivery providers if the association was not successful.

20. The method according to claim 18, further comprising performing a preliminary check of the structure of the recognized shipment number by means of the access device in order to determine whether it is the shipment number.

* * * * *